(12) United States Patent
Sahoo et al.

(10) Patent No.: US 10,527,808 B2
(45) Date of Patent: Jan. 7, 2020

(54) FLAME RETARDANT OPTICAL FIBER CABLE

(71) Applicant: Sterlite Technologies Limited, Aurangabad (IN)

(72) Inventors: Kishore Sahoo, Aurangabad (IN); Venkatesh Murthy, Aurangabad (IN); Dnyaneshwar Wagh, Aurangabad (IN); Sunil Senapati, Aurangabad (IN); Ashutosh Pandey, Aurangabad (IN)

(73) Assignee: STERLITE TECHNOLOGIES LIMITED, Aurangabad, MH (IN)

(*) Notice: Subject to any disclaimer, the term of this patent is extended or adjusted under 35 U.S.C. 154(b) by 102 days.

(21) Appl. No.: 15/942,224

(22) Filed: Mar. 30, 2018

(65) Prior Publication Data
US 2018/0348460 A1    Dec. 6, 2018

(30) Foreign Application Priority Data

May 30, 2017 (IN) .............................. 201721018968

(51) Int. Cl.
*G02B 6/44* (2006.01)

(52) U.S. Cl.
CPC .......... *G02B 6/4436* (2013.01); *G02B 6/441* (2013.01); *G02B 6/4432* (2013.01); *G02B 6/4494* (2013.01)

(58) Field of Classification Search
CPC ....... G02B 6/44; G02B 6/4435; G02B 6/4436
See application file for complete search history.

(56) References Cited

U.S. PATENT DOCUMENTS

2018/0231729 A1* 8/2018 Baetz ................... G02B 6/4435

* cited by examiner

*Primary Examiner* — Sung H Pak
*Assistant Examiner* — Hoang Q Tran

(57) ABSTRACT

The present disclosure provides a flame retardant optical fiber cable. The flame retardant optical fiber cable includes a plurality of bundle binders. In addition, the flame retardant optical fiber cable includes a first layer, a second layer, a third layer, a fourth layer, a fifth layer, a sixth layer, a seventh layer and an eighth layer. The first layer surrounds a plurality of bundle binders. The second layer surrounds the first layer. The third layer surrounds the second layer. The fourth layer surrounds the third layer. The fifth layer surrounds the fourth layer. The sixth layer surrounds the fifth layer. The seventh layer surrounds the sixth layer. The eighth layer surrounds the seventh layer.

19 Claims, 1 Drawing Sheet

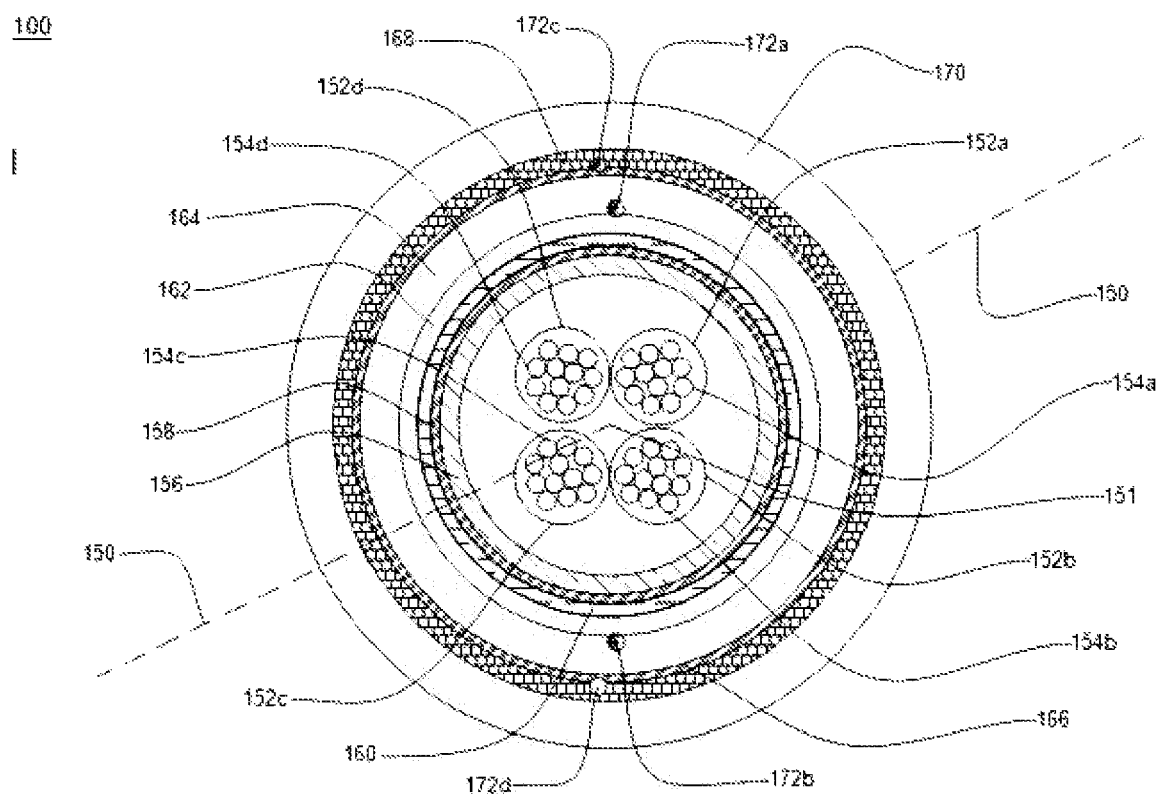

FLAME RETARDANT OPTICAL FIBER CABLE

TECHNICAL FIELD

The present disclosure relates to the field of optical fiber cable and, in particular, relates to a flame retardant optical fiber cable. The present application is based on, and claims priority from an Indian Application Number 201721018968 filed on 30 May 2017 the disclosure of which is hereby incorporated by reference herein.

BACKGROUND

Nowadays, one of the major issues in cable manufacturing industry lies in improving the behavior and the performance of fire resistant cables under extreme temperature conditions, and in particular those that are to be encountered during a fire. The fire resistant cables which require stringent fire performance has to undergo conformance with the comprehensive references to the one or more safety standards. Presently, the fire resistant cables available have certain drawbacks. Most of these fire resistant cables are bulkier in size. In addition, these fire resistant cables are unable to maintain circuit integrity under fire conditions.

In light of the above-stated discussion, there is a need for a fire resistant cable that overcomes the above-stated disadvantages.

SUMMARY

In a first example, the present disclosure provides a flame retardant optical fiber cable. The flame retardant optical fiber cable includes a plurality of bundle binders. The plurality of bundle binders lying substantially along a longitudinal axis of the flame retardant optical fiber cable. Further, the flame retardant optical fiber cable includes a first layer. The first layer surrounds the plurality of bundle binders. Moreover, the flame retardant optical fiber cable includes a second layer. The second layer surrounds the first layer. Furthermore, the flame retardant optical fiber cable includes a third layer. The third layer surrounds the second layer. In addition, the flame retardant optical fiber cable includes a fourth layer. The fourth layer surrounds the third layer. Also, the flame retardant optical fiber cable includes a fifth layer. The fifth layer surrounds the fourth layer. The flame retardant optical fiber cable includes a sixth layer. The sixth layer surrounds the fifth layer. Further, the flame retardant optical fiber cable includes a seventh layer. The seventh layer surrounds the sixth layer. Moreover, the flame retardant optical fiber cable includes an eighth layer. The eighth layer surrounds the seventh layer. The plurality of bundle binders includes a plurality of optical fibers. The first layer is a loose tube. The first layer is substantially made of steel. The fourth layer is a peripheral strength member. The fifth layer is a first jacket layer. The seventh layer is substantially an armoring layer. The eighth layer is a second jacket layer.

In a second example, the present disclosure provides a flame retardant optical fiber cable. The flame retardant optical fiber cable includes a plurality of bundle binders. The plurality of bundle binders lying substantially along a longitudinal axis of the flame retardant optical fiber cable. Further, the flame retardant optical fiber cable includes a first layer. The first layer surrounds the plurality of bundle binders. Moreover, the flame retardant optical fiber cable includes a second layer. The second layer surrounds the first layer. Furthermore, the flame retardant optical fiber cable includes a third layer. The third layer surrounds the second layer. In addition, the flame retardant optical fiber cable includes a fourth layer. The fourth layer surrounds the third layer. Also, the flame retardant optical fiber cable includes a fifth layer. The fifth layer surrounds the fourth layer. The flame retardant optical fiber cable includes a sixth layer. The sixth layer surrounds the fifth layer. Further, the flame retardant optical fiber cable includes a seventh layer. The seventh layer surrounds the sixth layer. Moreover, the flame retardant optical fiber cable includes an eighth layer. The eighth layer surrounds the seventh layer. The flame retardant optical fiber cable includes a plurality of ripcords. The plurality of bundle binders includes a plurality of optical fibers. The first layer is a loose tube. The first layer is substantially made of steel. The fourth layer is a peripheral strength member. The fifth layer is a first jacket layer. The seventh layer is substantially an armoring layer. The eighth layer is a second jacket layer. The flame retardant optical fiber cable withstands a temperature of at least 930 degree Celsius. The plurality of ripcords includes a first plurality of ripcords and a second plurality of ripcords. The first plurality of ripcords is positioned at an interface of the fourth layer and the fifth layer. The second plurality of ripcords is positioned at an interface of the sixth layer and the seventh layer. The optical fiber cable is stressed for a first time period of about 60 minutes with the facilitation of flame at 930 degree Celsius with mechanical shocks. The optical fiber cable is further stressed for a second time period of about 60 minutes with the facilitation of water spray on the cable.

In a third example, the present disclosure provides a flame retardant optical fiber cable. The flame retardant optical fiber cable includes a plurality of bundle binders. The plurality of bundle binders lying substantially along a longitudinal axis of the flame retardant optical fiber cable. Further, the flame retardant optical fiber cable includes a first layer. The first layer surrounds the plurality of bundle binders. Moreover, the flame retardant optical fiber cable includes a second layer. The second layer surrounds the first layer. Furthermore, the flame retardant optical fiber cable includes a third layer. The third layer surrounds the second layer. In addition, the flame retardant optical fiber cable includes a fourth layer. The fourth layer surrounds the third layer. Also, the flame retardant optical fiber cable includes a fifth layer. The fifth layer surrounds the fourth layer. The flame retardant optical fiber cable includes a sixth layer. The sixth layer surrounds the fifth layer. Further, the flame retardant optical fiber cable includes a seventh layer. The seventh layer surrounds the sixth layer. Moreover, the flame retardant optical fiber cable includes an eighth layer. The eighth layer surrounds the seventh layer. The flame retardant optical fiber cable includes a plurality of ripcords. The plurality of bundle binders includes a plurality of optical fibers. The first layer is a loose tube. The first layer is substantially made of steel. The second layer is made of a fire resistance mica tape. The third layer is substantially made of water swellable yarns. The fourth layer is a peripheral strength member. The fourth layer is substantially made of glass roving yarns. The fifth layer is a first jacket layer. The fifth layer is substantially made of low smoke zero halogen material. The sixth layer is substantially made of a mica tape. The seventh layer is substantially an armoring layer. The seventh layer is substantially made of a corrugated ECCS tape. The eighth layer is a second jacket layer. The eighth layer is substantially made of low smoke zero halogen material. The flame retardant optical fiber cable withstands a temperature of at least 930 degree Celsius. The plurality of ripcords includes a first plurality of ripcords and a second plurality of ripcords.

The first plurality of ripcords is positioned at an interface of the fourth layer and the fifth layer. The second plurality of ripcords is positioned at an interface of the sixth layer and the seventh layer. The optical fiber cable is stressed for a first time period of about 60 minutes with the facilitation of flame at 930 degree Celsius with mechanical shocks. The optical fiber cable is further stressed for a second time period of about 60 minutes with the facilitation of water spray on the cable.

BRIEF DESCRIPTION OF FIGURES

Having thus described the disclosure in general terms, reference will now be made to the accompanying FIGURES, wherein:

FIG. 1 illustrates a cross sectional view of a flame retardant optical fiber cable, in accordance with an embodiment of the present disclosure;

It should be noted that the accompanying FIGURES are intended to present illustrations of exemplary embodiments of the present disclosure. These FIGURES are not intended to limit the scope of the present disclosure. It should also be noted that accompanying FIGURES are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifications for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates a cross sectional view of an optical fiber cable, in accordance with various embodiments of the present disclosure. The optical fiber cable is a flame retardant optical fiber cable 100. The flame retardant optical fiber cable 100 is used for the high temperature resistance purpose.

The flame retardant optical fiber cable 100 includes a plurality of bundle binders 152a-152d, a plurality of optical fibers 154a-154d, a first layer 156, a second layer 158, a third layer 160, a fourth layer 162. In addition, the flame retardant optical fiber cable 100 includes a fifth layer 164, a sixth layer 166, a seventh layer 168, and an eighth layer 170. Furthermore, the flame retardant optical fiber cable 100 includes a plurality of ripcords. The flame retardant optical fiber cable 100 is used for carrying light over long distances. Moreover, the flame retardant optical fiber cable 100 may simply be used to transmit optical signals (which may carry sensor data or communication data). Generally, the optical fiber present inside the cable is responsible for carrying light signals over long distances.

The flame retardant optical fiber cable 100 includes the plurality of bundle binders 152a-152d. In general, the bundle binder is a cover of the bunch of the plurality of optical fibers. Further, each of the plurality of bundle binders 152a-152d facilitates in distinguishes the bunch of the plurality of optical fibers 154a-154d inside the loose tube during installation. In addition, each of the plurality of bundle binders 152a-152d placed around the plurality of optical fibers 154a-154d to form an optical fiber bundle. In an embodiment of the present disclosure, each of the plurality of bundle binders 152a-152d is made of a polyester based material. In another embodiment of the present disclosure, the material of the plurality of bundle binders 152a-152d includes but may not be limited to poly-amide, polyethylene terephthalate and the like. Moreover, each of the plurality of bundle binders 152a-152d is used for encapsulating the plurality of optical fibers 154a-154d. Also, each of the plurality of bundle binders 152a-152d is used inside the loose tube for the identification of fibers.

In an embodiment of the present disclosure, the flame retardant optical fiber cable 100 includes four different colored bundle binders. Each of the plurality of bundle binders 152a-152d may be of any other color. In an example, the color of each of the plurality of bundle binders 152a-152d is selected from the group. The group includes blue, orange, green, brown and red color. In an example, the color of each of the plurality of bundle binders 152a-152d is selected from any other respective color as per requirement. In another embodiment of the present disclosure, the flame retardant optical fiber cable 100 may include any number of bundle binders. The plurality of bundle binders 152a-152d encloses the plurality of optical fibers 154a-154d. In an embodiment of the present disclosure, the bundle binder 152a encloses the plurality of optical fibers 154a. In addition, the bundle binder 152b encloses the plurality of optical fibers 154b. Further, the bundle binder 152c encloses the plurality of optical fibers 154c. Furthermore, the bundle binder 152d encloses the plurality of optical fibers 154d. Each of the plurality of bundle binders 152a-152d is used for encapsulating the plurality of optical fibers. The plurality of bundle binders 152a-152d facilitates in distinguishes the bunch of the plurality of optical fibers 154a-154d during installation. In another embodiment of the present disclosure, the flame retardant optical fiber cable 100 may include any number of bundle binders. In yet another embodiment of the present disclosure, the flame retardant optical fiber cable 100 does not include any bundle binder. In an embodiment of the present disclosure, each of the plurality of bundle binders 152a-152d encloses 12 colored optical fibers. The total number of optical fibers present in the flame retardant optical fiber cable is 48 (4*12=48), when the number of bundle binders is four. In another embodiment of the present disclosure, each of the plurality of bundle binders 152a-152d may include any number of optical fibers.

The flame retardant optical fiber cable 100 includes the plurality of optical fibers 154a-154d enclosed inside the plurality of bundle binders 152a-152d. Each of the plurality of optical fibers 154a-154d is a fiber used for transmitting information as light pulses from one end to another. In addition, each of the plurality of optical fibers 154a-154d is a thin strand of glass capable of transmitting optical signals. Also, each of the plurality of optical fibers 154a-154d is configured to transmit large amounts of information over long distances with relatively low attenuation. Further, each of the plurality of optical fibers 154a-154d includes a core region and a cladding region. The core region is an inner part of an optical fiber and the cladding section is an outer part of the optical fiber.

In an embodiment of the present disclosure, each of the plurality of optical fibers 154a-154d is a colored optical fiber. The color of each of the plurality of optical fibers 154a-154d is selected from the group. The group includes blue, orange, green, brown, slate, white, red, black, yellow, violet, pink and aqua. In another embodiment of the present disclosure, the optical fiber may be of any different color. The coloring is done for identification of each of the plurality of optical fibers 154a-154d. In an embodiment of the present disclosure, ring marking or different colors bundle binder grouping is used for the identification of optical fibers when the number of optical fiber is more than 12 fibers.

Each of the plurality of optical fibers 154a-154d is a single mode optical fiber. In an embodiment of the present disclosure, each of the plurality of optical fibers 154a-154d has a maximum attenuation of about 0.36 dB per kilometer at a wavelength of 1310 nanometers. In another embodiment of the present disclosure, each of the plurality of optical fibers 154a-154d has a maximum attenuation of about 0.22 dB per kilometer at a wavelength of 1550 nanometer. The attenuation of each of the plurality of optical fibers 154a-154d corresponds to a loss in optical power as the light travels through the plurality of fibers 154a-154d.

In an embodiment of the present disclosure, each of the plurality of optical fibers 154a-154d has a polarization mode dispersion of less than or equal to 0.2 ps $\sqrt{\text{km}}$. The polarization mode dispersion corresponds to spreading of optical signals when the two different polarizations of light in a waveguide travel at different speeds.

The flame retardant optical fiber cable 100 includes the first layer 156. The first layer 156 encloses the plurality of bundle binders 152a-152d and the plurality of optical fibers 154a-154d. In an embodiment of the present disclosure, the first layer 156 is a loose tube. In general, the loose tube is circular in shape and hollow from inside. Further, the loose tube is a tube that encloses optical fibers in a loose tube sheath. The loose tube sheath protects the optical fibers from physical damage. The loose tube sheath protects the optical fibers from any kind of force applied on the cable. In an embodiment of the present disclosure, the loose tube is a metallic loose tube. In addition, the loose tube is substantially made of steel. The steel tube has excellent mechanical performance with high tensile properties. In another embodiment of the present disclosure, the first layer 156 is made of any other material. The first layer 156 provides protection to the plurality of bundle binders 152a-152d and the plurality of optical fibers 154a-154d. In addition, the first layer 156 has very good mechanical properties without diminished safety and reliability.

The flame retardant optical fiber cable 100 includes the second layer 158. The second layer 158 surrounds the first layer 156. The second layer 158 is made of a fire resistance tape. In an embodiment of the present disclosure, the fire resistance tape is substantially a mica tape. In an embodiment of the present disclosure, the two layers of the mica tape with at least 15 percent overlap is helically wounded on the loose tube. The mica is a poor conductor of heat and includes high temperature resistant properties. The fire resistance tape is used to increase the fire resistance of the flame retardant optical fiber cable 100. In addition, the fire resistance tape is used to protect the flame retardant optical fiber cable 100 with respect to the flame. Furthermore, the fire resistance mica tape enhances the insulation effect.

The flame retardant optical fiber cable 100 includes the third layer 160. The third layer 160 surrounds the second layer 158. The third layer 160 is substantially made of water blocking elements. In an embodiment of the present disclosure, the water blocking elements are water swellable yarns. The water swellable yarns prevent the ingression of water in the core of the flame retardant optical fiber cable 100.

The flame retardant optical fiber cable 100 includes the fourth layer 162. The fourth layer 162 surrounds the third layer 160. The fourth layer 162 is a peripheral strength member. In an embodiment of the present disclosure, the peripheral strength member is substantially a glass roving yarn. The one full coverage layer of glass roving yarn is placed helically in clockwise direction on the third layer 160. Another full coverage layer of glass roving yarn is placed in anti-clockwise direction on the third layer 160. In addition, the fourth layer 162 protects the core of the flame retardant optical fiber cable 100 against the crush resistance. Furthermore, the fourth layer 162 provides tensile strength along the length of the flame retardant optical fiber cable 100. Generally, the tensile strength is the ability of a material to withstand a force. In more general sense, tensile strength of the material is the maximum amount of tensile stress that it can take before failure.

The flame retardant optical fiber cable 100 includes the fifth layer 164. The fifth layer 164 surrounds the fourth layer 162. In an embodiment of the present disclosure, the fifth layer 164 is a first jacket. The first jacket represents the inner jacket of the flame retardant optical fiber cable 100. The first jacket is substantially made of UV proof LSZH (low smoke zero halogen) material. In addition, the first jacket is black in color. In an embodiment of the present disclosure, the Low smoke zero halogen or low smoke free of halogen is a material classification composed of thermoplastic or thermoset compounds. The low smoke zero halogen materials emit limited smoke and no halogen when exposed to high sources of heat. Further, the jacketing of the low smoke zero halogen material reduces the amount and density of the smoke and increases the safety during fire. The fifth layer 164 provides the protection to the flame retardant optical fiber cable 100. Further, the fifth layer 164 provides good barrier and flame retardant characteristic to the flame retardant optical fiber cable 100. Moreover, the fifth layer 164 helps in the mechanical performance of the flame retardant optical fiber cable 100.

The flame retardant optical fiber cable 100 includes the sixth layer 166. The sixth layer 166 surrounds the fifth layer 164. The sixth layer 166 is substantially made of the fire resistance tape. In an embodiment of the present disclosure, the fire resistance tape is the mica tape (as described above). In an embodiment of the present disclosure, the two layers of the mica tape with at least 15 percent overlap is helically wounded on the fifth layer 164. In another embodiment of the present disclosure, the fire resistance tape may be any type of tape.

The flame retardant optical fiber cable 100 includes the seventh layer 168. The seventh layer 168 encloses the sixth layer 166. In an embodiment of the present disclosure, the seventh layer 168 is an armored layer. The armored layer is substantially made of corrugated ECCS tape. The corrugated ECCS tape is used to limit the signal attenuation during fire. In an embodiment of the present disclosure, the corrugated steel tape having thickness of about 0.145±0.025 millimeter and is coated with co-polymer having thickness of about 0.04±0.01 millimeter to improve the performance of the armoring layer. The standard for corrugation of tape is ~2.5 mm pitch and ~0.6 mm height in optical fiber cable industry. Further, the seventh layer 168 provides crush resistance and tensile resistance to the flame retardant optical fiber cable 100.

The flame retardant optical fiber cable 100 includes the eighth layer 170. The eighth layer 170 surrounds the seventh layer 168. In an embodiment of the present disclosure, the eighth layer 170 is a second jacket. The second jacket is substantially made of UV Proof LSZH (low smoke zero halogen) material. The second jacket is black in color. The eighth layer 170 provides the protection to the flame retardant optical fiber cable 100. In addition, the eighth layer 170 improves the mechanical performance of the flame retardant optical fiber cable 100.

The flame retardant optical fiber cable 100 includes the plurality of ripcords lying substantially along the longitudinal axis 150 of the flame retardant optical fiber cable 100. In addition, the longitudinal axis 150 of the flame retardant optical fiber cable 100 is an axis along the length of the cable. Further, the longitudinal axis 150 is an imaginary axis passing through the geometrical center 151 of the optical fiber cable 100. In an embodiment of the present disclosure, the number of ripcords present in the flame retardant optical fiber cable 100 is four. The plurality of ripcords includes a first plurality of ripcords 172a-172b and a second plurality of ripcords 172c-172d. In an embodiment of the present disclosure, the first plurality of ripcords 162a-172b includes 2 diagonally opposite ripcords. The first plurality of ripcords 172a-172b is positioned at an interface of the fourth layer 162 and the fifth layer 164. In an embodiment of the present disclosure, the second plurality of ripcords 172a-172b includes 2 diagonally opposite ripcords. The second plurality of ripcords 172c-172d is positioned at an interface of the sixth layer 166 and the seventh layer 168. In addition, each of the first plurality of ripcords 172a-172b and the second plurality of ripcords 172c-172d is made of polyester based twisted yarns. Further, the first plurality of ripcords 172a-172b facilitates easy stripping of the fifth layer 164 and the second plurality of ripcords 172c-172d facilitates easy stripping of the seventh layer 168 and the eighth layer 170. In another embodiment of the present disclosure, the number of ripcords present in the flame retardant optical fiber cable 100 may vary.

The flame retardant optical fiber cable 100 includes a filling gel (not shown in FIGURE). The filling gel is filled inside a core of the flame retardant optical fiber cable 100 and around the plurality of optical fibers 154a-154d. In addition, the core is a central region of the flame retardant optical fiber cable 100. In an example, the central region is the region below the first layer 156 and towards the center of the flame retardant optical fiber cable 100. In an embodiment of the present disclosure, the filling gel is a thixotropic gel. The thixotropic gel is a viscous fluid or gel under static conditions and flow when shaken or agitated. The thixotropic gel prevents the ingression of water inside the core of the flame retardant optical fiber cable 100.

In an embodiment of the present disclosure, the flame retardant optical fiber cable 100 with the loose tube and multilayer improves the waterproof, fireproof, rodent and other functions. Further, each layer of the multilayer flame retardant optical fiber cable 100 includes specific materials or material properties that prevents the cable from burning at high temperatures and reduces economic losses. In addition, the flame retardant optical fiber cable 100 improves the safety and life of the cable. Furthermore, the flame retardant optical fiber cable 100 withstands temperature of at least 930 degree Celsius. As, each layer of the multilayer flame retardant optical fiber cable 100 include specific materials that prevents cable to withstand temperature of at least 930 degree Celsius. In an example, the mica is a poor conductor of heat and includes high temperature resistant properties. Also, the fire resistance tape is used to increase the fire resistance of the flame retardant optical fiber cable 100. Moreover, the flame retardant optical fiber cable 100 has good flame retardant properties. Also, the flame retardant optical fiber cable 100 is suitable for indoor and outdoor environments. The flame retardant optical fiber cable 100 is stressed for a first time period of about 60 minutes with the facilitation of flame at 930 degree Celsius with the mechanical shocks. In addition, the flame retardant optical fiber cable 100 is further stressed for a second time period of about 60 minutes with the facilitation of water spray on the cable. Moreover, the thickness of each layer facilitates the flame retardant optical fiber cable 100 to withstand with fire and water spray test.

In an embodiment of the present disclosure, flame retardant optical fiber cable 100 is flexible and easy to handle and install. In addition, the flame retardant optical fiber cable 100 is UV protected. In an embodiment of the present disclosure, the flame retardant optical fiber cable 100 is handled using one or more elements. The one or more elements include a plurality of tools. In an embodiment of the present disclosure, the plurality of tools include a fiber stripping tool, wire stripping tool, scissors, sheath knife, snips, sheath removal tool, round cutter, linesmen pliers, needle nose pliers.

In an embodiment of the present disclosure, the flame retardant optical fiber cable 100 includes 12 optical fibers. In an embodiment, the first layer 156 has a first diameter in a range of about 1.6±0 3 mm and a second diameter in range of about 2.0±0.3 mm for 12 optical fibers. The first diameter represents the inner diameter and the second diameter represents the outer diameter. In an embodiment, the first layer 156 has a thickness in a range of about 0.20±0.05 mm for 12 optical fibers. The second layer 158 includes two layers of tape with minimum 15% overlap. In an embodiment, the second layer 158 has a thickness in a range of 0.13±0.02 mm for 12 optical fibers. In an embodiment, the fourth layer 162 has one full coverage layer helically clockwise and other full coverage layer anti-clockwise. In an embodiment, the fifth layer 164 has a first diameter in a range of about 7.0±0 3 mm and a second diameter in a range of about 10.0±0.3 mm for 12 optical fibers. In addition, the fifth layer 164 has a thickness in a range of about 1.5±0.3 mm for 12 optical fibers. In an embodiment, the low smoke zero halogen material of the fifth layer 164 has density of about 1.48±0.04 g/cm3. In an embodiment, the low smoke zero halogen material of the fifth layer 164 has limiting oxygen index of 38%. In an embodiment, the low smoke zero halogen material of the fifth layer 164 has halogen content of 0%. In an embodiment, the low smoke zero halogen material of the fifth layer 164 has melt flow index of 5 g/10. In an embodiment, the low smoke zero halogen material of the fifth layer 164 has tensile strength of 15 MPa minimum. In an embodiment, the low smoke zero halogen material of the fifth layer 164 has elongation of about 150±10%. In an embodiment, the sixth layer 166 includes two layers of tape with minimum 15% overlap. In an embodiment, the sixth layer 166 has a thickness in a range of about 0.13±0.02 mm for 12 optical fibers. In an embodiment, the seventh layer 168 has a thickness in a range of about 0.145±0.025 mm with co-polymer coating of 0.04±0.01 mm on either side of steel tape. In an embodiment, the eighth layer 170 has a first diameter in a range of about 12.0±1.0 mm and a second diameter in a range of about 16.0±1.0 mm for 12 optical fibers. In addition, the eighth layer 170 has a thickness in a range of about 2.0±0.3 mm for 12 optical fibers. In an embodiment, the low smoke zero halogen material of the eighth layer 170 has density of about 1.48±0.04 g/cm3. In an embodiment, the low smoke zero halogen material of the eighth layer 170 has limiting oxygen index of 38%. In an embodiment, the low smoke zero halogen material of the eighth layer 170 has halogen content of 0%. In an embodiment, the low smoke zero halogen material of the eighth layer 170 has melt flow index of 5 g/10. In an embodiment, the low smoke zero halogen material of the eighth layer 170 has tensile strength of about 15 MPa minimum. In an embodiment, the low smoke zero halogen material of the eighth layer 170 has elongation of about 150±10%. In an embodiment, the flame retardant optical fiber cable 100 has a diameter in a range of about 16.0±1.0 mm for 12 optical fibers. In an embodiment, the flame retardant optical fiber cable 100 has a weight of about 300±10% for 12 optical fibers. In an embodiment, the flame retardant optical fiber cable 100 is compliant with IEC 60332-1, IEC 60332-2, IEC 60332-3, EN 50267 (Replaced by IEC 60754-led 2.0), EN 50268 (Replaced By EN 61034-1:2005), Sheath Integrity Test IEC 60331-25 (750☐C @ 90 min), EN 50265 2.1 (Equivalent to 60332-1), BS EN50200 PH120, FT4/IEEE1202 (cable char height, total smoke), UL1685 (peak smoke release) and BS 8434-2 2003+A2:2009.

In an embodiment of the present disclosure, the optical fiber cable 100 includes 24 optical fibers. In an embodiment, the first layer 156 has a first diameter in a range of about 1.6±0.3 mm and a second diameter in range of about 2.0±0.3 mm for 24 optical fibers. In an embodiment, the first layer 156 has a thickness in a range of about 0.20±0.05 mm for 24 optical fibers. The second layer 158 includes two layers of tape with minimum 15% overlap. In an embodiment, the second layer 158 has a thickness in a range of about 0.13±0.02 mm for 24 optical fibers. In an embodiment, the fourth layer 162 has one full coverage layer helically clockwise and other full coverage layer anti-clockwise. In an embodiment, the fifth layer 164 has a first diameter in a range of about 7.0±0.3 mm and a second diameter in a range of about 10.0±0.3 mm for 24 optical fibers. In addition, the fifth layer 164 has a thickness in a range of about 1.5±0.3 mm for 24 optical fibers. In an embodiment, the low smoke zero halogen material of the fifth layer 164 has density of about 1.48±0.04 g/cm3. In an embodiment, the low smoke zero halogen material of the fifth layer 164 has limiting oxygen index of 38%. In an embodiment, the low smoke zero halogen material of the fifth layer 164 has halogen content of 0%. In an embodiment, the low smoke zero halogen material of the fifth layer 164 has melt flow index of 5 g/10. In an embodiment, the low smoke zero halogen material of the fifth layer 164 has tensile strength of about 15 MPa minimum. In an embodiment, the low smoke zero halogen material of the fifth layer 164 has elongation of 150±10%. In an embodiment, the sixth layer 166 includes two layers of tape with minimum 15% overlap. In an embodiment, the sixth layer 166 has a thickness in a range of about 0.13±0.02 mm for 24 optical fibers. In an embodiment, the seventh layer 168 has a thickness in a range of about 0.145±0.025 mm with co-polymer coating of about 0.04±0.01 mm on either side of steel tape. In an embodiment, the eighth layer 170 has a first diameter in a range of about 12.0±1.0 mm and a second diameter in a range of about 16.0±1.0 mm for 24 optical fibers. In addition, the eighth layer 170 has a thickness in a range of about 2.0±0.3 mm for 24 optical fibers. In an embodiment, the low smoke zero halogen material of the eighth layer 170 has density of about 1.48±0.04 g/cm3. In an embodiment, the low smoke zero halogen material of the eighth layer 170 has limiting oxygen index of 38%. In an embodiment, the low smoke zero halogen material of the eighth layer 170 has halogen content of 0%. In an embodiment, the low smoke zero halogen material of the eighth layer 170 has melt flow index of 5 g/10. In an embodiment, the low smoke zero halogen material of the eighth layer 170 has tensile strength of about 15 MPa minimum. In an embodiment, the low smoke zero halogen material of the eighth layer 170 has elongation of 150±10%. In an embodiment, the flame retardant optical fiber cable 100 has a diameter in a range of about 16.0±1.0 mm for 24 optical fibers. In an embodiment, the flame retardant optical fiber cable 100 has a weight of about 300±10% for 24 optical fibers. In an embodiment, the flame retardant optical fiber cable 100 is compliant with IEC 60332-1, IEC 60332-2, IEC 60332-3, EN 50267 (Replaced by IEC 60754-led 2.0), EN 50268 (Replaced By EN 61034-1:2005), Sheath Integrity Test IEC 60331-25 (750☐C @ 90 min.), EN 50265 2.1 (Equivalent to 60332-1), BS EN50200 PH120, FT4/IEEE1202 (cable char height, total smoke), UL1685 (peak smoke release) and BS 8434-2 2003+A2: 2009.

In yet another embodiment of the present disclosure, the flame retardant optical fiber cable 100 includes 48 optical fibers. In an embodiment, the first layer 156 has a first diameter in a range of about 3.6±0 5 mm and a second diameter in a range of about 4.0±0.5 mm for 48 optical fibers. The first diameter is the inner diameter and the second diameter is the outer diameter of the flame retardant optical fiber cable 100. In an embodiment, the first layer 156 has a thickness in a range of about 0.20±0.05 mm for 48 optical fibers. The second layer 158 includes two layers of tape with minimum 15% overlap. In an embodiment, the second layer 158 has a thickness in a range of about 0.13±0.02 mm for 48 optical fibers. In an embodiment, the fourth layer 162 has one full coverage layer helically clockwise and other full coverage layer anti-clockwise. In an embodiment, the fifth layer 164 has a first diameter in a range of about 7.7±0 3 mm and a second diameter in a range of about 10.7±0.3 mm for 48 optical fibers. In addition, the fifth layer 164 has a thickness in a range of about 1.5±0.3 mm for 48 optical fibers. In an embodiment, the low smoke zero halogen material of the fifth layer 164 has density of about 1.48±0.04 g/cm3. In an embodiment, the low smoke zero halogen material of the fifth layer 164 has limiting oxygen index of 38%. In an embodiment, the low smoke zero halogen material of the fifth layer 164 has halogen content of 0%. In an embodiment, the low smoke zero halogen material of the fifth layer 164 has melt flow index of 5 g/10. In an embodiment, the low smoke zero halogen material of the fifth layer 164 has tensile strength of 15 MPa minimum. In an embodiment, the low smoke zero halogen material of the fifth layer 164 has elongation of about 150±10%. In an embodiment, the sixth layer 166 includes two layers of tape with minimum 15% overlap. In an embodiment, the sixth layer 166 has a thickness in a range of about 0.13±0.02 mm for 48 optical fibers. In an embodiment, the seventh layer 168 has a thickness in a range of about 0.145±0.025 mm with co-polymer coating of 0.04±0.01 mm on either side of steel tape. In an embodiment, the eighth layer 170 has a first diameter in a range of about 13.0±0 3 mm and a second diameter in a range of about 17.0±1.0 mm for 48 optical fibers. In addition, the eighth layer 170 has a thickness in a range of about 2.0±0.3 mm for 48 optical fibers. In an embodiment, the low smoke zero halogen material of the eighth layer 170 has density of about 1.48±0.04 g/cm3. In an embodiment, the low smoke zero halogen material of the eighth layer 170 has limiting oxygen index of 38%. In an embodiment, the low smoke zero halogen material of the eighth layer 170 has halogen content of 0%. In an embodiment, the low smoke zero halogen material of the eighth layer 170 has melt flow index of 5 g/10. In an embodiment, the low smoke zero halogen material of the eighth layer 170 has tensile strength of 15 MPa minimum. In an embodiment, the low smoke zero halogen material of the eighth layer 170 has elongation of about 150±10%. In an embodiment, the optical fiber cable 100 has a diameter in a range of about 17.0±1.0 millimeters for 48 optical fibers. In an embodiment, the flame retardant optical fiber cable 100 has a weight of about 345±10% for 48 optical fibers. In an embodiment, the flame retardant optical fiber cable 100 is compliant with IEC 60332-1, IEC 60332-2, IEC 60332-3, EN 50267 (Replaced by IEC 60754-led 2.0), EN 50268 (Replaced By EN 61034-1:2005), Sheath Integrity Test IEC 60331-25 (750☐C @ 90 min.), EN 50265 2.1 (Equivalent to 60332-1), BS EN50200 PH120, FT4/IEEE1202 (cable char height, total smoke), UL1685 (peak smoke release) and BS 8434-2 2003+A2:2009.

In yet another embodiment of the present disclosure, the flame retardant optical fiber cable 100 may include any number of optical fibers. The first layer, second layer, third layer, fourth layer, fifth layer, sixth layer, seventh layer and eighth layer may have different dimensions for multiple fiber counts. In an embodiment, ring marking or different color bundle binder grouping may be used for identification in case of more than 12 optical fibers.

In an embodiment of the present disclosure, the flame retardant optical fiber cable 100 has a crush resistance of about 4000 Newton/10 centimeters. Crush resistance determines the ability of the flame retardant optical-fiber cable 100 to withstand and/or recover from the effects of compressive forces. In an embodiment of the present disclosure, the flame retardant optical fiber cable 100 has a maximum tensile strength of about 3000 Newton. In an embodiment of the present disclosure, the flame retardant optical fiber cable 100 has impact strength of about 25 Newton meter. The impact strength is the ability of the flame retardant optical fiber cable 100 to absorb shock and impact energy without breaking. In an embodiment of the present disclosure, the flame retardant optical fiber cable 100 has repeated bend radius of about 20 D when it is tested for about 20 cycles. In an embodiment of the present disclosure, the flame retardant optical fiber cable 100 has torsion of ±180 degree. In an embodiment of the present disclosure, the flame retardant optical fiber cable 100 has a kink radius of about 10 D, where D is the cable diameter of the flame retardant optical fiber cable 100. The kink radius corresponds to the minimum radius of the flame retardant optical fiber cable 100 to bend without kinking or damaging the flame retardant optical fiber cable 100. In addition, the kink radius is the minimum radius at which the flame retardant optical fiber cable 100 bends without affecting the life of the cable. Further, the minimum kink radius provides more flexibility to the flame retardant optical fiber cable 100. Moreover, the kink radius is the minimum loop radius at the onset of kinking of the flame retardant optical fiber cable 100. Furthermore, the kink radius is the minimum radius which allows looping or bending of each of the plurality of optical fibers 154a-154d in each bundle binder of the plurality of bundle binders 152a-152d without sustaining any damage.

The flame retardant optical fiber cable has numerous advantages over the prior art. The flame retardant optical fiber cable 100 has a long service life. In addition, the temperature resistance of the flame retardant optical fiber cable 100 lies in between −40 degree Celsius and 70 degree Celsius. Moreover, the optimized dimensions of sub parts of the flame retardant optical fiber cable 100 reduce the size of cable. Furthermore, the flame retardant optical fiber cable 100 has very good mechanical properties without diminished safety and reliability. Also, the flame retardant optical fiber cable 100 maintains circuit integrity under fire conditions and provides security for the transmission of data over long distances.

The present disclosure includes a multiple steps for the preparation and handling of the flame retardant optical fiber cable 100.

The first step includes of consulting the work instructions to determine the position of end preparation of the flame retardant optical fiber cable 100.

The second step includes of cutting of at least one meter cable from the end of each of the flame retardant optical fiber cable 100 after placement to avoid any problem that may have occurred during cable placement.

The third step includes to determine how much of the cable jacket needs to be removed from the cable to make the end preparation for splice. When no length is recommended, the one meter of cable jacket is removed from the cable end to make splice. In addition, the third step includes of placing a tape marker or pen mark on the cable jacket at the recommended distance for end of cable sheath removal.

The fourth step includes of placing a wrap of tape around the cable sheath at the specified distance from the end of the cable corresponding to the sheath length to be removed. This is done to fit the splice closure being used which is recommended by the closure manufacturer. Furthermore, one meter length is used when no length is specified or recommended.

The fifth step includes of cutting the end portion of the cable jacket and corrugated steel tape with the help of rotating sheath cutter or hooked knife. In an embodiment of the present disclosure, the ring cut for removing jacket and steel tape is approximately from 10 to 15 cm from its end.

The sixth step includes of grasping the cable jacket on either side of the cut and flexes the jacket of the cable. The cable jacket will open along the ring cut. In addition, the sixth step includes of pulling off the end 10 to 15 cm of cable jacket from the cable core. Moreover, the sixth step includes of exposing the ripcords that are located under the cable jacket.

The seventh step includes of removing each mating cable jacket to the marking tape using the rip-cords that is accessed from the 10 to 15 cm portion of the jacket. In addition, the seventh step includes of placing a notch in the plastic cable jacket for the rip-cord to follow as it is pulled back along the cable jacket. Further, the seventh step includes of pulling the rip-cord until the end marker is reached for the end sheath removal. Moreover, if a second rip-cord is present, it is used to tear a second slit in the jacket 180 degree opposite to the first.

The eighth step includes of removing last 15 cm of cable sheath from the cable-core with a pulling action. In addition, the eighth step includes of cutting the binding yarns over the mica tape using splicer shears or knife. Moreover, the eighth step includes of removing the mica tape from first LSZH jacket. Furthermore, the eighth step includes of cutting the end portion of the cable LSZH jacket. After ring cutting the LSZH jacket, grasp the cable jacket on either side of the cut and flex the jacket of the cable. This will allow the cable jacket to open along the ring cut.

The ninth step includes removing the inner cable jacket up to the marking (approximately 1 meter into the cable) using the rip-cords accessed from the 10 to 15 cm portion of the jacket. In addition, the ninth step includes of placing a notch in the plastic cable jacket for the rip-cord to follow as it is pulled back along the cable jacket. As the rip-cord is pulled, it tears its way through the inner jacket. Continue pulling of the rip-cord until the end marker is reached, result in end sheath removal. Moreover, if the second rip-cord is present, use it to tear a second slit in the jacket 180 degree opposite the first.

The tenth step includes of removing the peripheral strength yarns from the core and get access to the binder yarns. In addition, the tenth step further includes of cutting the binding yarns over the mica tape using splicer shears or knife. It also includes removal of the mica tape from steel tube to access the steel tube for end preparation.

The eleventh step includes cutting the steel tube for accessing optical fibers. In addition, it also includes a step to check the tool's performance on a small section of the buffer tube. A properly adjusted tool will score the buffer tube without completely cutting through the tube. When the tube is gently flexed it will break along the score.

The twelfth step includes of cutting the bundle binders over the fiber to access the plurality of fibers in end access splices in most applications. In addition, the color coding of bundle binder helps to determine the tubes containing the fibers to be spliced and those to be dropped off.

The thirteenth step includes of locating any spacer buffer tubes filled with non-optical quality fiber or filler elements. In addition, the spacer buffer tube or fillers is being cut using a cable cutter or splicer's shears.

The fourteenth step includes of cleaning the gel or water blocking material from the steel tube using lint-free, wipers and an approved gel cleaning agent until the cable core us free of gel or water blocking material.

The flame retardant optical fiber cable 100 is aimed to not only protect against, flame propagation, drip and toxicity to protect people trapped, but also to protect internally the fibers. The protection of fibers is necessary to maintain the signal integrity and to keep signs, fire doors, cctv operational for as long as possible to ensure routes are visible and accessible in the event of fire.

In an embodiment of the present disclosure, the flame retardant optical fiber cable 100 includes one or more fire rating requirements.

The first fire rating requirement includes BS EN 50200 corresponds to a method of test for resistance to fire of unprotected small cables for use in emergency circuits. This is a test for small cables (it defines up to and including 20 mm diameter) with a flame temperature of 850° C. and a physical impact. This impact is a steel bar striking the predefined backboard the cable is mounted on at intervals for the duration of the test. The test durations are 15, 30, 60, 90 or 120 minutes with cable integrity for defined classifications of PH15, PH30, PH60, PH90 or PH120.

In addition, when the 2006 BS EN was reviewed it was revised to include BS 8434-1 test which was significant. The 2000 version had testing elements of flame and indirect shock only and this was insufficient to meet the requirements of BS 5839-1: 2002 'standard' fire resisting cables because there was no water test. This meant that the most commonly needed fire resistant cable had to meet the requirements of two tests in two British Standards. The 2006 review was revised to incorporate the water spray element of BS 8434-1 into it is Annex 'E'. This has meant that 'standard' fire resisting cables required by BS 5839-1 must achieve PH30 AND Annex 'E' of BS EN 50200:2006. So, two tests now within the same standard. For emergency escape lighting systems described by BS 5266-1 'standard' fire resisting cables are required to achieve PH60 classification and Annex E. This is still a regular discussion point: 'standard' fire resisting cables must pass two fire tests 'Annex E' and PH30/PH60.

The second fire rating requirement includes BS 8434-2: 2003+A2:2009 corresponds to a method of test for assessment of the fire integrity of electric cables. This is a test for unprotected small cables for use in emergency circuits. It includes BS EN 50200 with a 930° C. flame and with water spray. This test method is used to assess a cable for 'enhanced' fire resistance required for applications in fire detection, fire alarm, emergency escape lighting and some life safety and firefighting control circuits. In addition, it is for small cables but at a higher nominal flame temperature, 930° C. as opposed to 850° C. BS 8434-2 is a two hour test which includes direct flame, indirect impact and a water spray test. Cables that are required for 'enhanced' fire resisting circuits must meet BS EN 50200 PH120 classification and they must also meet BS 8434-2. The cable is stressed by the flame at 930° C. with mechanical shocks for 60 minutes and further 60 minutes with the addition of water spray. This fire test is for the additional performance required by 'enhanced' fire resisting cables and is the procedure used by the fire test engineer. Furthermore, the second test includes passing criteria of maximum circuit continuity 2 hours under one or more conditions. The one or more conditions include a worst case of fire load at 930 degree Celsius, water and shock and the like.

The third fire rating requirement includes BS EN 50582: 2016 corresponds to a procedure to assess the circuit integrity of optical fibers in a cable under resistance to fire testing. It further includes two different methods of performing the continuity of optical signal supply. The first method includes the monitoring of individual fibers for attenuation change. The second method includes loop-back measurements. Moreover, the third fire rating requirements describes the cable test procedure referring EN 50200 or in EN 50577. It also includes test equipment, sample preparation, test procedure, optical measurements during fire and duration of survival and the test report requirements for flame retardant optical fiber cables 100.

Design and installation of flame retardant optical fiber cables 100 for critical circuits will result in a long term commercial viability of the network, future proof benefits for the network, its investors and its consumers. It is essential to protect equipment and minimize the risk of loss of circuit integrity that could potentially harm personnel, property or equipment and will be a truly nation building project.

The flame retardant optical fiber cable 100 is used for indoor and outdoor purposes. In an example, the flame retardant optical fiber cable 100 may be used in traffic areas, wind farm developments, pipelines, oil and gas fields, heavy industrial sites.

Further, it may be noted that in FIG. 1, the flame retardant optical fiber cable 100 includes four bundle binder; however, those skilled in the art would appreciate that more or less number of bundle binder are included in the flame retardant optical fiber cable 100.

The significance of the above disclosed optical fiber cable 100 is its overall structure. The optical fiber cable 100 disclosed above is flame retardant optical fiber cable 100 due to the arrangement of each layer and the material with which each layer is made. The overall structure and design of the above disclosed flame retardant optical fiber cable 100 allows it to withstand a temperature of about 930 degrees Celsius. Further, the flame retardant optical fiber cable 100 has better performance as per the BS 8434-2:2003+A2:2009 standards.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A flame retardant optical fiber cable comprising:
a plurality of bundle binders lying substantially along a longitudinal axis of the flame retardant optical fiber cable, wherein the plurality of bundle binders comprising a plurality of optical fibers;
a first layer surrounding the plurality of bundle binders, wherein the first layer is a loose tube, wherein the first layer is substantially made of steel;
a second layer surrounding the first layer;
a third layer surrounding the second layer;
a fourth layer surrounding the third layer, wherein the fourth layer is a peripheral strength member;
a fifth layer surrounding the fourth layer, wherein the fifth layer is a first jacket layer;
a sixth layer surrounding the fifth layer;
a seventh layer surrounding the sixth layer, wherein the seventh layer is an armoring layer; and
an eighth layer surrounding the seventh layer, wherein the eighth layer is a second jacket layer,
wherein the flame retardant optical fiber cable withstands a temperature of at least 930 degree Celsius.

2. The flame retardant optical fiber cable as claimed in claim 1, wherein the second layer is substantially made of a mica tape, wherein the third layer is substantially made of water swellable yarns, wherein the fourth layer is substantially made of glass roving yarns, wherein the fifth layer is substantially made of low smoke zero halogen material, wherein the sixth layer is substantially made of a mica tape, wherein the seventh layer is substantially made of a corrugated ECCS tape, wherein the eighth layer is substantially made of low smoke zero halogen material.

3. The flame retardant optical fiber cable as claimed in claim 1 further comprising a plurality of ripcords, wherein the plurality of ripcords comprises a first plurality of ripcords and a second plurality of ripcords, wherein the first plurality of ripcords is positioned at an interface of the fourth layer and the fifth layer, wherein the second plurality of ripcords is positioned at an interface of the sixth layer and the seventh layer.

4. The flame retardant optical fiber cable as claimed in claim 1, wherein the flame retardant optical fiber cable is stressed for a first time period of about 60 minutes with the facilitation of flame at 930 degree Celsius with mechanical shocks, wherein the flame retardant optical fiber cable is further stressed for a second time period of about 60 minutes with the facilitation of water spray on the cable.

5. The flame retardant optical fiber cable as claimed in claim 1, wherein the first layer has a first diameter in a range of about 1.6±0.3 millimeters, a second diameter in a range of about 2.0±0.3 millimeters, a thickness in a range of about 2.00±0.05 millimeters, wherein the second layer has a thickness in a range of about 0.13±0.02 millimeter, wherein the fifth layer has a first diameter in a range of about 7.0±0.3 millimeters, a second diameter in a range of about 10.0±0.3 millimeters and a thickness in a range of about 1.5±0.3 millimeters, wherein the sixth layer has a thickness in a range of about 0.13±0.02 millimeter, wherein the seventh layer has a thickness in a range of about 0.145±0.025 millimeter when the flame retardant optical fiber cable has one of 12 optical fibers, 24 optical fiber and 48 optical fibers.

6. The flame retardant optical fiber cable as claimed in claim 1, wherein the eighth layer has a first diameter in a range of about 12.0±1.0 millimeters, a second diameter in a range of about 16.0±1.0 millimeters and a thickness in a range of about 2.0±0.3 millimeters when the flame retardant optical fiber cable has one of 12 optical fibers and 24 optical fibers, wherein the eighth layer has a first diameter in a range of about 13.0±1.0 millimeters, a second diameter in a range of about 17.0±1.0 millimeters and a thickness in a range of about 2.0±0.3 millimeters when the flame retardant optical fiber cable comprises 48 fibers.

7. The flame retardant optical fiber cable as claimed in claim 1, wherein the flame retardant optical fiber cable has a diameter in a range of about 16.0±1.0 millimeters and a weight of about 300±10% kilograms/kilometer when the flame retardant optical fiber cable has one of 12 optical fibers and 24 optical fibers, wherein the flame retardant optical fiber cable has a diameter in a range of about 17.0±1.0 millimeter and a weight of about 345±10% kilograms/kilometer when the flame retardant optical fiber cable comprises 48 optical fibers.

8. The flame retardant optical fiber cable as claimed in claim 1, wherein the flame retardant optical fiber cable has impact strength of about 25 Newton meter, wherein the flame retardant optical fiber cable has a crush resistance of about 400 Newton per 10 centimeter, wherein the flame retardant optical fiber cable has a maximum tensile strength of about 3000 Newton, wherein the flame retardant optical fiber cable has a kink radius of about 10 D, wherein D is the cable diameter of the flame retardant optical fiber cable.

9. A flame retardant optical fiber cable comprising:
a plurality of bundle binders lying substantially along a longitudinal axis of the flame retardant optical fiber cable, wherein the plurality of bundle binders comprising a plurality of optical fibers;
a first layer surrounding the plurality of bundle binders, wherein the first layer is a loose tube, wherein the first layer is substantially made of steel;
a second layer surrounding the first layer;
a third layer surrounding the second layer;
a fourth layer surrounding the third layer, wherein the fourth layer is a peripheral strength member;
a fifth layer surrounding the fourth layer, wherein the fifth layer is a first jacket layer;
a sixth layer surrounding the fifth layer;
a seventh layer surrounding the sixth layer, wherein the seventh layer is an armoring layer;
an eighth layer surrounding the seventh layer, wherein the eighth layer is a second jacket layer; and
a plurality of ripcords, wherein the plurality of ripcords comprises a first plurality of ripcords and a second plurality of ripcords, wherein the first plurality of ripcords is positioned at an interface of the fourth layer and the fifth layer, wherein the second plurality of ripcords is positioned at an interface of the sixth layer and the seventh layer,
wherein the flame retardant optical fiber cable withstands a temperature of at least 930 degree Celsius, and
wherein the flame retardant optical fiber cable is stressed for a first time period of about 60 minutes with the facilitation of flame at 930 degree Celsius with mechanical shocks, wherein the flame retardant optical fiber cable is further stressed for a second time period of about 60 minutes with the facilitation of water spray on the cable.

10. The flame retardant optical fiber cable as claimed in claim 9, wherein the second layer is substantially made of a mica tape, wherein the third layer is substantially made of water swellable yarns, wherein the fourth layer is substantially made of glass roving yarns, wherein the fifth layer is substantially made of low smoke zero halogen material, wherein the sixth layer is substantially made of a mica tape, wherein the seventh layer is substantially made of a corrugated ECCS tape, wherein the eighth layer is substantially made of low smoke zero halogen material.

11. The flame retardant optical fiber cable as claimed in claim 9, wherein the first layer has a first diameter in a range of about 1.6±0.3 millimeters, a second diameter in a range of about 2.0±0.3 millimeters, a thickness in a range of about 2.00±0.05 millimeters, wherein the second layer has a thickness in a range of about 0.13±0.02 millimeter, wherein the fifth layer has a first diameter in a range of about 7.0±0.3 millimeters, a second diameter in a range of about 10.0±0.3 millimeters and a thickness in a range of about 1.5±0.3 millimeters, wherein the sixth layer has a thickness in a range of about 0.13±0.02 millimeter, wherein the seventh layer has a thickness in a range of about 0.145±0.025 millimeter when the flame retardant optical fiber cable has one of 12 optical fibers, 24 optical fiber and 48 optical fibers.

12. The flame retardant optical fiber cable as claimed in claim 9, wherein the eighth layer has a first diameter in a range of about 12.0±1.0 millimeters, a second diameter in a range of about 16.0±1.0 millimeters and a thickness in a range of about 2.0±0.3 millimeters when the flame retardant optical fiber cable has one of 12 optical fibers and 24 optical fibers, wherein the eighth layer has a first diameter in a range of about 13.0±1.0 millimeters, a second diameter in a range of about 17.0±1.0 millimeters and a thickness in a range of about 2.0±0.3 millimeters when the flame retardant optical fiber cable comprises 48 fibers.

13. The flame retardant optical fiber cable as claimed in claim 9, wherein the flame retardant optical fiber cable has a diameter in a range of about 16.0±1.0 millimeters and a weight of about 300±10% kilograms/kilometer when the flame retardant optical fiber cable has one of 12 optical fibers and 24 optical fibers, wherein the flame retardant optical fiber cable has a diameter in a range of about 17.0±1.0 millimeter and a weight of about 345±10% kilograms/kilometer when the flame retardant optical fiber cable comprises 48 optical fibers.

14. The flame retardant optical fiber cable as claimed in claim 9, wherein the flame retardant optical fiber cable has impact strength of about 25 Newton meter, wherein the flame retardant optical fiber cable has a crush resistance of about 400 Newton per 10 centimeter, wherein the flame retardant optical fiber cable has a maximum tensile strength of about 3000 Newton, wherein the flame retardant optical fiber cable has a kink radius of about 10 D, wherein D is the cable diameter of the optical fiber cable.

15. A flame retardant optical fiber cable comprising:
a plurality of bundle binders lying substantially along a longitudinal axis of the flame retardant optical fiber cable, wherein the plurality of bundle binders comprising a plurality of optical fibers;
a first layer surrounding the plurality of bundle binders, wherein the first layer is a loose tube, wherein the first layer is substantially made of steel;
a second layer surrounding the first layer, wherein the second layer is substantially made of a mica tape;
a third layer surrounding the second layer, wherein the third layer is substantially made of water swellable yarns;
a fourth layer surrounding the third layer, wherein the fourth layer is a peripheral strength member, wherein the fourth layer is substantially made of glass roving yarns;
a fifth layer surrounding the fourth layer, wherein the fifth layer is a first jacket layer, wherein the fifth layer is substantially made of low smoke zero halogen material;
a sixth layer surrounding the fifth layer, wherein the sixth layer is substantially made of a mica tape;
a seventh layer surrounding the sixth layer, wherein the seventh layer is an armoring layer, wherein the seventh layer is substantially made of a corrugated ECCS tape;
an eighth layer surrounding the seventh layer, wherein the eighth layer is a second jacket layer, wherein the eighth layer is substantially made of low smoke zero halogen material; and
a plurality of ripcords, wherein the plurality of ripcords comprises a first plurality of ripcords and a second plurality of ripcords, wherein the first plurality of ripcords is positioned at an interface of the fourth layer and the fifth layer, wherein the second plurality of ripcords is positioned at an interface of the sixth layer and the seventh layer,
wherein the flame retardant optical fiber cable withstands a temperature of at least 930 degree Celsius, and
wherein the flame retardant optical fiber cable is stressed for a first time period of about 60 minutes with the facilitation of flame at 930 degree Celsius with mechanical shocks, wherein the flame retardant optical fiber cable is further stressed for a second time period of about 60 minutes with the facilitation of water spray on the cable.

16. The flame retardant optical fiber cable as claimed in claim 15, wherein the first layer has a first diameter in a range of about 1.6±0.3 millimeters, a second diameter in a range of about 2.0±0.3 millimeters, a thickness in a range of about 2.00±0.05 millimeters, wherein the second layer has a thickness in a range of about 0.13±0.02 millimeter, wherein the fifth layer has a first diameter in a range of about 7.0±0.3 millimeters, a second diameter in a range of about 10.0±0.3 millimeters and a thickness in a range of about 1.5±0.3 millimeters, wherein the sixth layer has a thickness in a range of about 0.13±0.02 millimeter, wherein the seventh layer has a thickness in a range of about 0.145±0.025 millimeter when the flame retardant optical fiber cable has one of 12 optical fibers, 24 optical fiber and 48 optical fibers.

17. The flame retardant optical fiber cable as claimed in claim 15, wherein the eighth layer has a first diameter in a range of about 12.0±1.0 millimeters, a second diameter in a range of about 16.0±1.0 millimeters and a thickness in a range of about 2.0±0.3 millimeters when the flame retardant optical fiber cable has one of 12 optical fibers and 24 optical fibers, wherein the eighth layer has a first diameter in a range of about 13.0±1.0 millimeters, a second diameter in a range of about 17.0±1.0 millimeters and a thickness in a range of about 2.0±0.3 millimeters when the flame retardant optical fiber cable comprises 48 fibers.

18. The flame retardant optical fiber cable as claimed in claim 15, wherein the flame retardant optical fiber cable has a diameter in a range of about 16.0±1.0 millimeters and a weight of about 300±10% kilograms/kilometer when the flame retardant optical fiber cable has one of 12 optical fibers and 24 optical fibers, wherein the flame retardant optical fiber cable has a diameter in a range of about 17.0±1.0 millimeter and a weight of about 345±10% kilograms/kilometer when the optical fiber cable comprises 48 optical fibers.

19. The flame retardant optical fiber cable as claimed in claim 15, wherein the flame retardant optical fiber cable has an impact strength of about 25 Newton meter, wherein the flame retardant optical fiber cable has a crush resistance of about 400 Newton per 10 centimeter, wherein the flame retardant optical fiber cable has a maximum tensile strength of about 3000 Newton, wherein the flame retardant optical fiber cable has a kink radius of about 10 D, wherein D is the cable diameter of the flame retardant optical fiber cable.

* * * * *